US011261357B2

(12) United States Patent
Thiede et al.

(10) Patent No.: US 11,261,357 B2
(45) Date of Patent: Mar. 1, 2022

(54) THERMALLY ACTIVATABLE, FAST CURING ADHESIVE COATING

(71) Applicant: UNIVERSITÄT KASSEL, Kassel (DE)

(72) Inventors: Holger Thiede, Kassel (DE); Stefan Böhm, Kassel (DE)

(73) Assignee: UNIVERSITÄT KASSEL, Kassel (DE)

( * ) Notice: Subject to any disclaimer, the term of this patent is extended or adjusted under 35 U.S.C. 154(b) by 0 days.

(21) Appl. No.: 16/884,548

(22) Filed: May 27, 2020

(65) Prior Publication Data

US 2020/0283661 A1 Sep. 10, 2020

Related U.S. Application Data

(63) Continuation of application No. 15/762,941, filed as application No. PCT/EP2016/072532 on Sep. 22, 2016, now Pat. No. 10,711,169.

(30) Foreign Application Priority Data

Sep. 23, 2015 (DE) ..................... 10 2015 012 172.3

(51) Int. Cl.
| | | |
|---|---|---|
| *C09J 163/00* | (2006.01) | |
| *B32B 7/12* | (2006.01) | |
| *H01F 3/02* | (2006.01) | |
| *B32B 15/04* | (2006.01) | |
| *C09J 7/28* | (2018.01) | |
| *B32B 15/01* | (2006.01) | |
| *B32B 37/12* | (2006.01) | |
| *C09J 5/06* | (2006.01) | |
| *C08K 3/04* | (2006.01) | |
| *C08K 3/34* | (2006.01) | |
| *C08K 3/22* | (2006.01) | |
| *C08K 3/32* | (2006.01) | |

(52) U.S. Cl.
CPC .............. *C09J 163/00* (2013.01); *B32B 7/12* (2013.01); *B32B 15/011* (2013.01); *B32B 15/043* (2013.01); *B32B 37/1207* (2013.01); *C09J 5/06* (2013.01); *C09J 7/28* (2018.01); *H01F 3/02* (2013.01); *B32B 2255/06* (2013.01); *B32B 2255/26* (2013.01); *B32B 2264/102* (2013.01); *B32B 2264/104* (2013.01); *B32B 2307/208* (2013.01); *B32B 2307/30* (2013.01); *B32B 2307/752* (2013.01); *C08K 3/04* (2013.01); *C08K 3/34* (2013.01); *C08K 2003/2265* (2013.01); *C08K 2003/325* (2013.01); *C08K 2003/327* (2013.01); *C08K 2003/328* (2013.01); *C09J 2301/416* (2020.08); *C09J 2400/163* (2013.01); *C09J 2463/00* (2013.01)

(58) Field of Classification Search
CPC ..................................................... C09J 163/00
See application file for complete search history.

(56) References Cited

U.S. PATENT DOCUMENTS

| | | | |
|---|---|---|---|
| 2002/0058099 A1 | 5/2002 | Stevens et al. | |
| 2009/0288766 A1 | 11/2009 | Kramer et al. | |
| 2013/0280536 A1* | 10/2013 | Voci ..................... | C09D 175/06 428/413 |
| 2014/0037966 A1 | 2/2014 | Renkel et al. | |
| 2016/0237304 A1* | 8/2016 | Fischer ................ | C08G 59/182 |

FOREIGN PATENT DOCUMENTS

| | | |
|---|---|---|
| DE | 3878416 T2 | 7/1993 |
| DE | 102008026613 A1 | 12/2009 |
| EP | 2390351 A1 | 11/2011 |
| EP | 2468834 A1 | 6/2012 |
| JP | 6306345 A | 11/1994 |
| JP | 1161072 A | 3/1999 |
| JP | 11162723 A | 6/1999 |
| JP | 2004277701 A | 10/2004 |
| JP | 2008280538 A | 11/2008 |
| JP | 200938915 A | 2/2009 |
| JP | 2013241538 A | 12/2013 |
| RU | 2122556 01 | 11/1998 |
| RU | 2387685 02 | 4/2010 |
| SU | 1299525 A3 | 3/1987 |

OTHER PUBLICATIONS

European Patent Office, "International Search Report and Written Opinion of the International Searching Authority," in connection to PCT/EP2016/072532, filed Sep. 22, 2016, dated Dec. 15, 2016.
European Patent Office, "Written Opinion of the International Searching Authority," in connection to PCT/EP2016/072532, filed Sep. 22, 2016, dated Dec. 15, 2016.
Naderi et al., "The role of zinc aluminum phosphate anticorrosive pigment in Protective Performance and cathodic disbondment of epoxy coating", Corrosion Science, vol. 52, pp. 1291-1296, 2010.

* cited by examiner

*Primary Examiner* — Daniel H Lee
(74) *Attorney, Agent, or Firm* — McKee, Voorhees & Sease, PLC

(57) ABSTRACT

The present invention relates to a thermally activatable adhesive composition for use in a method for producing a stack of metal sheets from glued together sheet metal components, the use of the adhesive composition in a method for producing a stack of metal sheets from glued together sheet metal components, the method for producing a stack of metal sheets from glued together sheet metal components, a sheet metal component coated with the adhesive composition, and a stator or rotor core containing one or more of such sheet metal components.

15 Claims, No Drawings

THERMALLY ACTIVATABLE, FAST CURING ADHESIVE COATING

CROSS-REFERENCE TO RELATED APPLICATIONS

This application is a continuation of nonprovisional application U.S. Ser. No. 15/762,941, filed on Mar. 23, 2018, which is a National Phase application claiming priority to PCT/EP2016/072532, filed Sep. 22, 2016, which claims priority to DE 10 2015 012 172.3 filed Sep. 23, 2015, all of which are herein incorporated by reference in their entirety.

The present invention relates to a thermally activatable adhesive composition for use in a method for producing a stack of metal sheets from glued together sheet metal components, the use of the adhesive composition in a method for producing a stack of metal sheets from glued together sheet metal components, the method for producing a stack of metal sheets from glued together sheet metal components, a sheet metal component coated with the adhesive composition, and a stator or rotor core containing one or more of such sheet metal components.

The efficiency of an electric motor is influenced by a plurality of its components, the overall concept of which makes it possible to convert electrical energy to kinetic energy. These components include plate stacks, by means of which power is transferred. The plate stacks are, for example, used as parts of the stators and/or rotors of electric motors. Plate stacks are produced from many very thin electrical sheet steels. Electrical sheet steels have excellent properties when it comes to conducting and amplifying magnetic fields. The individual laminations are insulated from each other and decisively influence the efficiency of the electric motor. Here, the composition and absence of voltage of the metal sheets, the value of their electric resistance and the integrity of the insulation are important influencing factors. These influencing factors are substantially determined by the method, in particular the surface or punctiform binding of the metal sheets to one another, and the machining quality, for example the punching burr.

In the field of electrical engineering, the term stacking refers to the joining of individual metal sheets, so-called laminations, to form a stack. A stack is an ordered stack of many metal sheets that are connected to each other in a stationary manner. Such a stack of metal sheets replaces the massive iron core. The connection of the metal sheets to form the stack is, for example, realized by screwing or by means of clamps applied to the outside of the stack. Such connections make it possible to release the connection, but the performance of the electric machine is generally negatively influenced by such connecting means, for example due to an electrical short circuit in the area of the connecting means or a disturbed magnetic field.

A further known joining method is welding. During welding, the metal sheets are joined thermally and integrally. The punched and stacked laminations are clamped in a device and joined on the outer radius by means of a plurality of welding seams oriented orthogonally to the lamination plane. However, welding damages the laminations and their insulation layer and can result in an increase in eddy current losses or affect the magnetic field. It is indeed true that the freedom of design is hardly limited by the welding seam, but a stack produced in such a way can no longer be separated in a destruction-free manner.

So-called interlocking is known as a one-step process. When interlocked, the electrical sheet steel is punched out of the raw material, placed on the stack and joined to the stack in one machine stroke. When it is punched out and/or placed down or fixed, mechanical connections are produced in the electrical sheet steel that interact with the connections of the adjacent electrical sheet steels. These connections are elevations, also referred to as cams or knobs, that are embossed into the electrical sheet steel. Because the insulation coating in the area of the deformation can become damaged, short circuits cannot be ruled out. Furthermore, the connection is limiting in terms of design and affects the magnetic field due to the local connection means.

The use of adhesives as connecting means is also known. One form of adhesion is the use of so-called baked enamels as described, for example, in DE 35 03 019 C2 and DE 38 29 068 C1. The raw material, a virtually endless sheet metal strip, is generally coated with a baked enamel. After the individual laminations are separated from the sheet metal strip coated with baked enamel, they are aligned with respect to each other and placed on top of each other, thus forming a stack. This stack of still unconnected metal sheets is subsequently heated to a reaction temperature of the baked enamel over a defined period of time, usually 30 to 150 minutes. The reaction temperature is usually 150° C. to 250° C. During the application of heat, the stack is subjected to a pressure of 2 to 6 Newtons per square millimeter. This is followed by a cooling phase that lasts up to 60 minutes. It is indeed true that the use of a baked enamel makes it possible to achieve a full-surface and resistant connection of the individual laminations without damaging the metal structure or the insulation layer, but the baking and cooling processes are very time-consuming and therefore difficult to integrate into continuous mass production.

The invention is based on the object of improving the method for producing stacks of metal sheets in such a way that mass production is possible in large quantities and with short cycle times.

This object is achieved in a first aspect by a thermally activatable adhesive compound containing:
  100 parts by weight of an epoxy resin;
  4 to 8 parts by weight of a latent curing agent; and
  4 to 10 parts by weight of a latent accelerator
as well as the use thereof in a method for producing a stack of metal sheets from glued together sheet metal components.

The term "latent curing agent" refers to a substance that is used to cure epoxy resin but first needs to be activated by being supplied with chemical or thermal energy.

Accordingly, the term "latent accelerator" refers to a substance that is used to accelerate the curing of the epoxy resin by the curing agent and likewise first needs to be activated by being supplied with chemical or thermal energy.

It is essential for the adhesive to be a thermally activatable adhesive. It is only finally cured after the sheet metal components are connected (joined), but can be activated throughout the various stages of processing and thus be brought into an adhesive state. Chronological and/or spatial separation of the individual functions is thus provided. The application of the adhesive on one of the two components is done in a first method step. After this, the adhesive is dried and hardened such that it no longer has an adhesive surface.

The adhesive compound according to the invention allows for an extremely short activation time of, for example, 0.5-1 second and an extremely short curing time of, for example, a maximum of 5 seconds. Furthermore, the adhesive compound according to the invention is characterized by a high temperature stability of, for example, 190° C. as well as a high insulation and aging capacity.

The adhesive compound according to the invention is a multi-component adhesive that contains, in particular, an epoxy resin component, a curing agent and an accelerator.

The first component is formed by one or more epoxy resins having more than one epoxy group of which preferably at least one epoxy resin has a softening point of >50° C.

The epoxy resins can be aliphatic, cycloalophatic or aromatic epoxy resins. Aliphatic epoxy resins contain components that have both an aliphatic group and at least two epoxy resin groups.

Examples of aliphatic epoxy resins may include butanediol diglycidyl ether, hexanediol diglycidyl ether, dimethylpentane dioxide, butadiene dioxide, diethylene glycol diglycidyl ether.

Cycloaliphatic epoxy resins are, for example, 3-cyclohexenylmethyl-3-cyclohexylcarboxylatediepoxide, 3,4-epoxycyclohexylalkyl-3',4'-epoxycyclohexanecarboxylate, 3,4-epoxy-6-methylcyclohexylmethyl-3',4'-epoxy-6-methylcyclohexanecarboxylate, vinyl cyclohexane dioxide, bis(3,4-epoxycyclohexylmethyl)adipate, dicyclopentadiene dioxide, 1,2-epoxy-6-(2,3-epoxypropoxy)hexahydro-4,7-methanoindane.

Aromatic epoxy resins are, for example, bisphenol A epoxy resins, bisphenol F epoxy resins, phenol novolac epoxy resins, cresol novolac epoxy resins, biphenyl epoxy resins, biphenol epoxy resins, 4,4'-biphenyl epoxy resins, divinylbenzene dioxide, 2-glycidylphenylglycidylether, tetraglycidylmethylenedianiline.

In a preferred embodiment of the present invention, the epoxy resin is an aqueous dispersion of bisphenol A epoxy resin.

The second component is formed by one or more substances used to cure the epoxy resin that preferably undergo curing reactions with the epoxy resins of the adhesive compound at temperatures in the range of 80° C. to 200° C.

The curing agents can contain dicyandiamides, aziridine derivatives, triazine derivatives, imidazolines, imidazoles, o-tolylbiguanide, cyclic amidines, organic hexafluoroantimonate or hexafluorophosphate compounds or $BF_3$ amine complexes. The compounds can be used individually or combined.

Examples include 2-methylimidazole, 2-undecylimidazole, 2-heptadecylimidazole, 1,2-dimethylimidazole, 2-ethyl-4-methylimidazole, 2-phenylimidazle, 2-phenyl-4-methylimidazole, 1-benzyl-2-methylimidazole, 1-benzyl-2-phenylimidazole, 1-cyanoethyl-2-methylimidazole, 1-cyanoethyl-2-undecylimidazole, 1-cyanoethyl-2-ethyl-4-methylimidazole, 1-cyanoethyl-2-phenylimidazole, 1-cyanoethyl-2-undecylimidazolium trimellitate, 1-cyanoethyl-2-phenylimidazolium trimellitate, 2,4-diamino-6-[2'-methylimidazolyl-(1')]-ethyl-s-triazine, 2,4-diamino-6-[2'undecylimidazolyl-(1')]-ethyl-s-triazine, 2,4-diamino-6-[2'-ethyl-4'-methylimidazolyl-(1')]-ethyl-s-2,4-diamino-6-[2"-methylimidazolyl-(1')]ethyl-s-triazine, 2-phenylimidazole, 2-phenyl-4,5-dihydroxymethylimidazole, 2-phenyl-4-methyl-5-hydroxymethylimidazole, 2,3-dihydro-1H-pyrrolo[1,2-a]benzimidazole, (1-dodecyl-2-methyl-3-benzyl)imidazolium chloride, 2-methylimidazoline, 2-phenylimidazoline, 2,4-diamino-6-vinyl-1,3,5-triazine, 2,4-diamino-6-vinyl-1,3,5-triazine isocyanic acid adduct, 2,4-diamino-6-methacryloyloxyethyl-1,3,5-triazine, 2,4-diamino-6-methacryloyloxyethyl-1,3,5-triazine isocyanic acid adduct, 1,3,5-triazine, 2,4-diamino-6-methyl-1,3,5-triazine, 2,4-diamino-6-nonyl-1,3,5-triazine, 2,4-diamino-6-phenyl-1,3,5-triazine, 2,4-dimethoxy-6-methyl-1,3,5-triazine, 2,4-dimethoxy-6-phenyl-1,3,5-triazine, 2-amino-4,6-dimethyl-1,3,5-triazine, 2-amino-4-dimethylamino-6-methyl-1,3,5-triazine, 2-amino-4-ethoxy-6-methyl-1,3,5-triazine, 2-amino-4-ethyl-6-methoxy-1,3,5-triazine, 2-amino-4-methoxy-6-methyl-1,3,5-triazine, 2-amino-4-methyl-6-phenyl-1,3,5-triazine, 2-chloro-4,6-dimethoxy-1,3,5-triazine, 2-ethylamino-4-methoxy-6-methyl-1,3,5-triazine, 1-o-tolylbiguanide.

In a preferred embodiment of the present invention, the curing agent contains a dicyandiamide, an imidazole, a $BF_3$ amine complex or a combination thereof.

The third component is formed by one or more accelerators that accelerate the reaction between the epoxy resin and curing agent.

In a preferred embodiment of the present invention, the accelerator contains a urea derivative and/or an imidazole.

The adhesive compound according to the invention can also contain additional components.

In a preferred embodiment, the adhesive compound according to the invention contains 2 to 12 parts by weight of one or more anti-corrosion additives selected from the group consisting of zinc aluminum molybdate phosphates and strontium aluminum polyphosphates.

Other anti-corrosion additives that can be used according to the invention are zinc phosphates, aluminum phosphates, zinc aluminum orthophosphates, zinc molybdate orthophosphates, calcium hydrogen phosphates, zinc strontium phosphate silicates, zinc aluminum polyphosphates, calcium aluminum polyphosphates, zinc calcium strontium aluminum phosphate silicates, oxyaminophosphate salts, zinc salts or iron mica.

In another preferred embodiment, the adhesive compound according to the invention contains 5 to 15 parts by weight of one or more insulation additives selected from the group consisting of kaolin and mica.

According to the invention an insulation additive is a substance that has an electrically insulating effect.

In another preferred embodiment, the adhesive compound according to the invention contains 0.2 to 8 parts by weight of absorption additives selected from the group consisting of carbon blacks and iron oxides.

According to the invention an absorption additive is a substance that absorbs thermal radiation.

In another preferred embodiment, the adhesive compound according to the invention contains one or more additives selected from the group consisting of fillers, dispersants and film-forming agents.

Examples of dispersants include surfactants, polyanions and phosphates.

Examples of film-forming agents include esters, ether alcohols and glycols.

The adhesive components are preferably selected in such a way that temperatures in the range of 20–30° C. can be selected during mixing without causing the adhesive to be cured as a result of the mixing process. The applied adhesive is stable in storage at room temperature for several months and can later be cured within a very short period of time by being heated to temperatures of over 100° C., for example 150° C. or 180° C.

If no solvent or dispersant is added to the adhesive compound, the adhesive compound can be applied, for example, as a so-called "reactive hot melt adhesive." A hot melt adhesive must be heated to its melting temperature before application so that it is liquified. Melting temperatures of reactive hot melt adhesives are typically within the range of 60° C. to 100° C. The reaction then takes place at temperatures in the range of 150° C.–180° C.

A particularly preferred adhesive variant is based on aqueous epoxy resin dispersions.

These essentially contain at least the aforementioned substances, i.e., 100 parts by weight of an epoxy resin; 4 to 8 parts by weight of a latent curing agent; and 4 to 10 parts by weight of a latent accelerator.

The aqueous dispersion is, if necessary, diluted with water to such an extent that it can be applied in the desired layer thickness to the metal sheet to be precoated by means of spraying, painting and other application methods. After the application, the water is evaporated such that an adhesive layer that is dry and non-adhesive at 20° C. and thermally activatable remains.

All of the components mentioned can, of course, also be provided dissolved in organic solvents. However, this variant is not preferred because the use of organic solvents should be reduced for ecological reasons and, moreover, the components that react with each other are present as a solution and may therefore already react with each other in the preparation. In an aqueous dispersion, however, the components are present separately as dispersed particles, which results in particularly good storage stability of the preparation.

Alternatively, the adhesive mixtures can also be provided as powders. These powders are sintered onto the metal sheet using the methods for applying powder coatings known from the prior art. The layer that is formed is in turn thermally activated after the composite has been produced with a further metal sheet.

Once the metal sheet has been precoated with the thermally activatable adhesive compound or the adhesive that is preferably non-adhesive ("tack-free") at 20° C., the component that is provided with such an adhesive layer is joined on a counter adhesive surface of the other component in a chronologically and/or spatially subsequent process step. At least one of the metal sheets is precoated with the adhesive layer, and at least two metal sheets are joined.

The adhesive is cured before, during and/or after joining by heating the adhesive layer to a temperature that is high enough for the necessary chemical reaction between the epoxy resin, curing agent and accelerator.

The extremely short activation and curing time of the adhesive compound according to the invention makes it possible to activate the adhesive even before joining the stack of metal sheets such that it already starts to be cured during the joining. This saves time and thus makes it possible to produce stacks of metal sheets at high cycle rates.

Accordingly, the present invention also relates to a method for producing a stack of metal sheets from glued together sheet metal components, at least two sheet metal components being joined with an adhesive layer in between to form a composite body, characterized in that an adhesive compound that is described here and thermally activated before or during joining is used as an adhesive.

Thus, according to the invention, a method for manufacturing a stack of metal sheets produced from a plurality of metal sheets stacked on top of each other is provided in which the electrical sheet steels can be punched out immediately before or during stacking. The use of a raw material that is provided with a coat containing an adhesive according to the invention on at least one side and the punching, stacking and joining possible in a work step makes it possible to mass produce stacks of metal sheets with short cycle times and in large quantities.

In a preferred embodiment of the method according to the invention, one of the sheet metal components is coated with the adhesive compound before the joining is done to form the compound body, the adhesive compound hardening before the joining is done to form the compound body but not being cured such that the free surface of the adhesive layer does not have an adhesive property.

In another preferred embodiment of the method according to the invention, the thermal activation takes place by means of infrared radiation. Infrared radiation makes it possible to reduce the activation time to preferably under 0.5 seconds, for example 0.3 seconds. Furthermore, it is cost-effective and can be used without large equipment and energy expenditures.

The subject matter of the present invention is also a sheet metal component coated with a previously described adhesive compound.

In a preferred embodiment of the present invention, the sheet metal component is a steel sheet.

The sheet metal components produced by the method according to the invention described here are particularly suitable for use in stator or rotor cores.

Accordingly, a further subject matter of the present invention is a stator or rotor core containing one or more of the previously described sheet metal components.

The present invention is explained in greater detail with reference to the following examples.

EXAMPLES

Experiments were conducted with two products according to the invention (examples 1 and 2) and two comparable prior art products (Voltatex 1175W from Axalta and Dispercoll U 8755 from Bayer Materials Science).

Experimental Conditions:

Application of the adhesive to an electrical sheet steel, sheet thickness 0.3 mm Layer thickness after drying process: 5-6 μm Sample geometry: 25 mm×100 mm Testing of lap shear strength based on DIN EN 1465

Overlapping length: 12.5 mm

Joining the samples in the hot press: 200° C., 1 s (see example 1)

or joining the samples by means of NIR radiation (0.3 s) (see example 2)

|  | Baked enamel (Voltatex 1175 W) | PU dispersion (Dispercoll U8755) | Example 1 | Example 2 |
|---|---|---|---|---|
| Adhesive designation: | | | | |
| EpiRez 5108-W-60 (bisphenol A epoxy resin) | | | 100 parts | 100 parts |
| Dyhard 100 SF (dicyandiamide) | | | 6 parts | 6 parts |

-continued

|  | Baked enamel (Voltatex 1175 W) | PU dispersion (Dispercoll U8755) | Example 1 | Example 2 |
| --- | --- | --- | --- | --- |
| Dyhard URAcc57 (urea derivative) |  |  | 8 parts | 8 parts |
| Heucophos SAPP (strontium aluminum polyphosphate hydrate) |  |  | 8 parts | 8 parts |
| Kaolin | — | — | 15 parts | 15 parts |
| Iron oxide | — | — | — | 2 parts |
| Results: |  |  |  |  |
| Joining process | Hot press, 200° C., 1 s | Hot press, 200° C., 1 s | Hot press, 200° C., 1 s | NIR radiation, 0.3 s, joining at RT |
| Lap shear strength | 0.5 MPa | 1.7 MPa | 6.1 MPa | 6.3 MPa |
| Lap shear strength at 190° C. | 0 MPa | 0 MPa | 2.1 MPa | 1.2 MPa |

The experimental data proves that an adhesive compound according to the invention results in a lap shear strength of the obtained sheet metal composite that cannot be achieved by adhesive compounds of the prior art with the same activation time.

The invention claimed is:

1. A thermally activatable adhesive compound to use in a method for producing a stack of metal sheets from glued together sheet metal components containing an aqueous dispersion comprising:
   100 parts by weight of an epoxy resin;
   4 to 8 parts by weight of a latent curing agent;
   4 to 10 parts by weight of a latent accelerator; and
   water,
   and wherein said thermally activatable adhesive compound is free of organic solvent.

2. A thermally activatable adhesive compound according to claim 1, further containing: 2 to 12 parts by weight of one or more anti-corrosion additives of zinc aluminum molybdate phosphates and/or strontium aluminum polyphosphates.

3. The adhesive compound according to claim 1, further containing: 5 to 15 parts by weight of one or more insulation additives of kaolin and/or mica.

4. The adhesive compound according to claim 1, further containing: 0.2 to 8 parts by weight of absorption additives of carbon blacks and/or iron oxide.

5. The adhesive compound according to claim 1, further containing one or more of the following: fillers, dispersants and film-forming agents.

6. The adhesive compound according to claim 1, characterized in that the epoxy resin is an aqueous dispersion of bisphenol A epoxy resin.

7. The adhesive compound according to claim 1, characterized in that the latent curing agent contains a dicyandiamide, a $BF_3$ amine complex or a combination thereof.

8. The adhesive compound according to claim 1, characterized in that the latent accelerator contains an urea derivative and/or an imidazole.

9. The adhesive compound according to claim 1, characterized in that the thermally activatable adhesive is activatable throughout the various stages of processing.

10. The adhesive compound according to claim 1, characterized in that the thermally activatable adhesive is finally cured after the sheet metal components are connected.

11. The adhesive compound according to claim 1, characterized in that the epoxy resins are selected from the group consisting of bisphenol A epoxy resins, bisphenol F epoxy resins, phenol novolac epoxy resins, cresol novolac epoxy resins, biphenol epoxy resins, 4,4'-biphenol epoxy resins, divinylbenzene dioxide, 2-glycidylphenylglycidylether, and tetraglycidylmethylenedianiline.

12. The adhesive compound according to claim 1, characterized in that the latent curing agent comprises one or more substances which undergoes curing reactions with the epoxy resin at temperatures in the range of 80° C. to 200° C.

13. The adhesive compound according to claim 1, characterized in that the epoxy resin, the latent curing agent, the latent accelerator, and the water are mixable at temperatures in the range of 20° C. to 30° C. without causing the adhesive to be cured.

14. The adhesive compound according to claim 1, characterized in that the thermally activatable adhesive compound is stable in storage at room temperature and thereafter curable.

15. The adhesive compound according to claim 1, characterized in that after application of the adhesive compound and evaporation of the water, a formed adhesive layer is dry and non-adhesive at 20° C. and thermally activatable.

* * * * *